United States Patent [19]
Whiteaker

[11] Patent Number: 5,704,158
[45] Date of Patent: Jan. 6, 1998

[54] TACKLE MANAGEMENT SYSTEM

[76] Inventor: Michael E. Whiteaker, 5147 Old Lemay Ferry Rd., Imperial, Mo. 63052

[21] Appl. No.: 663,854

[22] Filed: Jun. 19, 1996

Related U.S. Application Data

[63] Continuation of Ser. No. 315,971, Sep. 30, 1994, abandoned.
[51] Int. Cl.⁶ ................................................. A01K 97/06
[52] U.S. Cl. ........................ 43/57.1; 43/54.1; 206/315.11
[58] Field of Search ........................... 43/54.1, 57.1, 43/315.11; 206/315.11; 312/DIG. 33; 190/30, 33, 35

[56] References Cited

U.S. PATENT DOCUMENTS

| | | | |
|---|---|---|---|
| 3,005,671 | 10/1961 | Majeski | 43/54.1 |
| 4,033,066 | 7/1977 | Morcorr | 43/54.1 |
| 4,085,987 | 4/1978 | Vartdal | 206/315.11 |
| 4,829,699 | 5/1989 | Perkins | 43/57.1 |
| 4,841,661 | 6/1989 | Moore | 43/54.1 |
| 4,958,730 | 9/1990 | Bunten | 43/57.1 |
| 5,054,669 | 10/1991 | Zimbardi | 43/54.1 |
| 5,079,863 | 1/1992 | Gillespie | 43/57.1 |
| 5,176,281 | 1/1993 | Fiore | 206/315.11 |
| 5,205,429 | 4/1993 | Woolworth | 43/54.1 |
| 5,305,544 | 4/1994 | Testa | 43/54.1 |

*Primary Examiner*—Kurt Rowan
*Attorney, Agent, or Firm*—Kalish & Gilster

[57] ABSTRACT

A tackle management system for securely organizing fishing tackle or the like. The system comprises a cabinet with a passageway for removing and inserting boxes within the cabinet. Boxes are sized for storage within the cabinet. The cabinet includes a series of access and storage channels mounted along an inner surface of the cabinet. Each box includes a channel engager for interlocking with a channel. The channel engager provides for rearrangement of the boxes within the cabinet without disengagement of the boxes from the channels. A method of drying tackle while contained in a fishing tackle-enclosure by providing the enclosure with at least two openings and forcing air in through one of the openings and out through another opening.

20 Claims, 5 Drawing Sheets

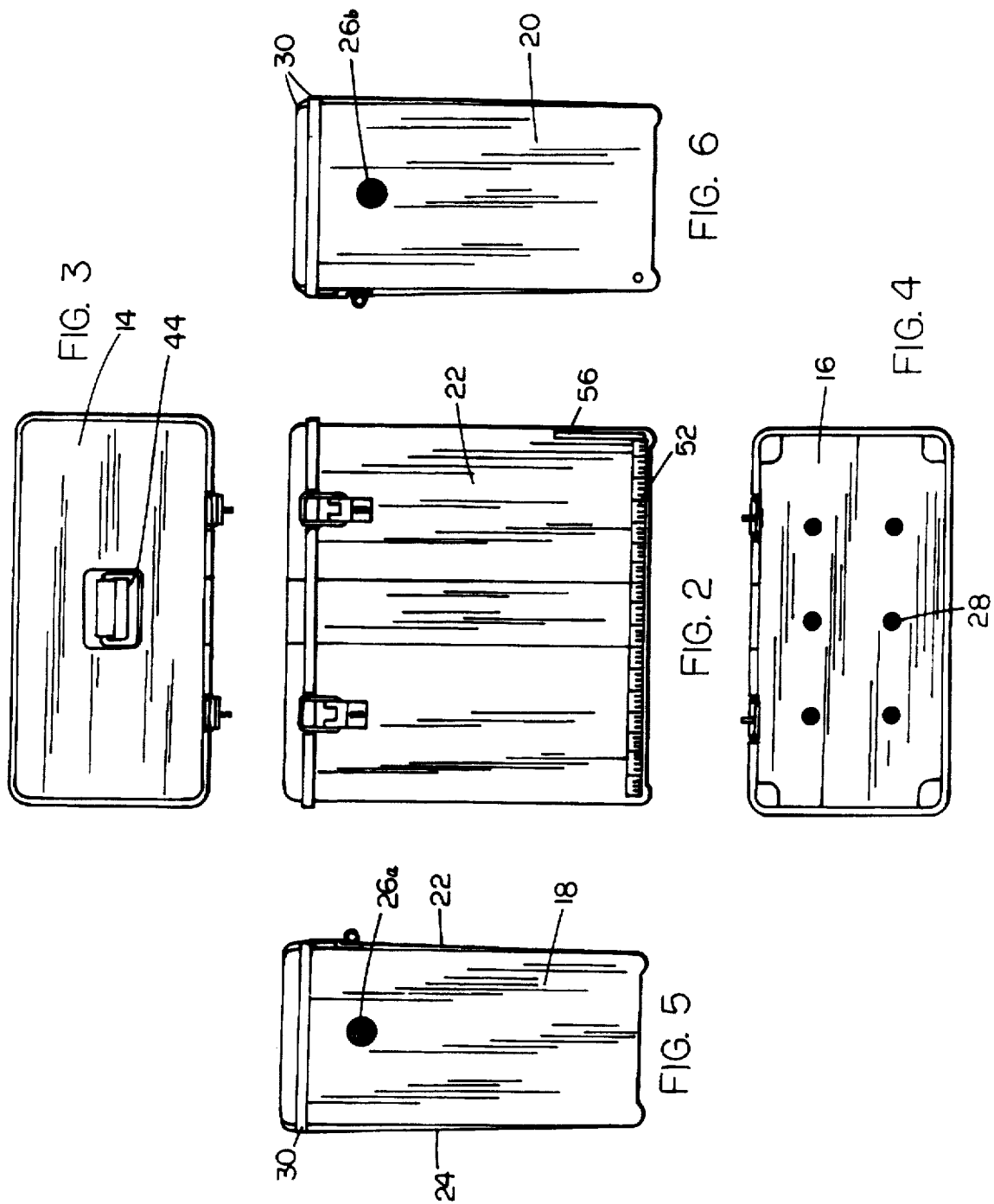

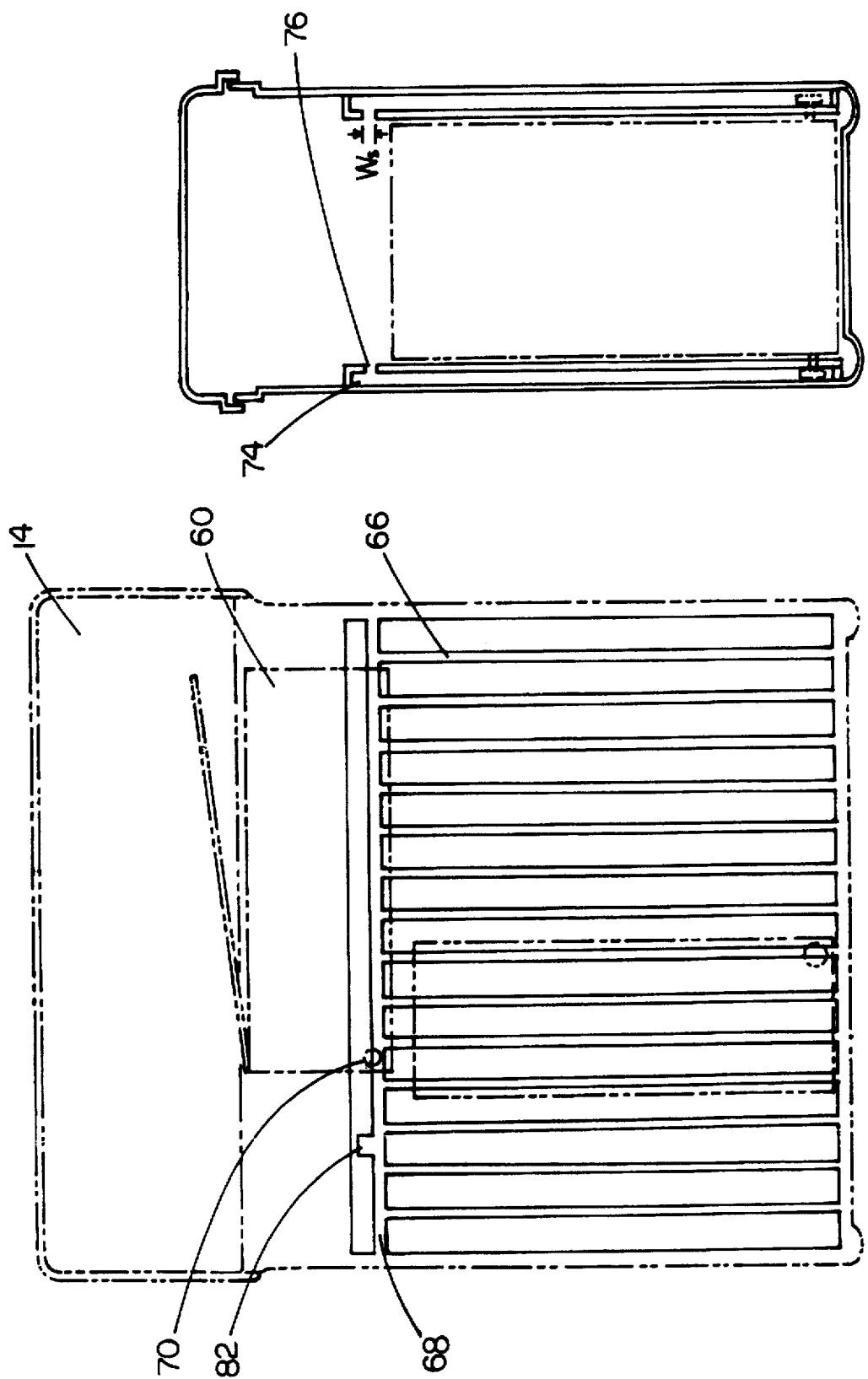

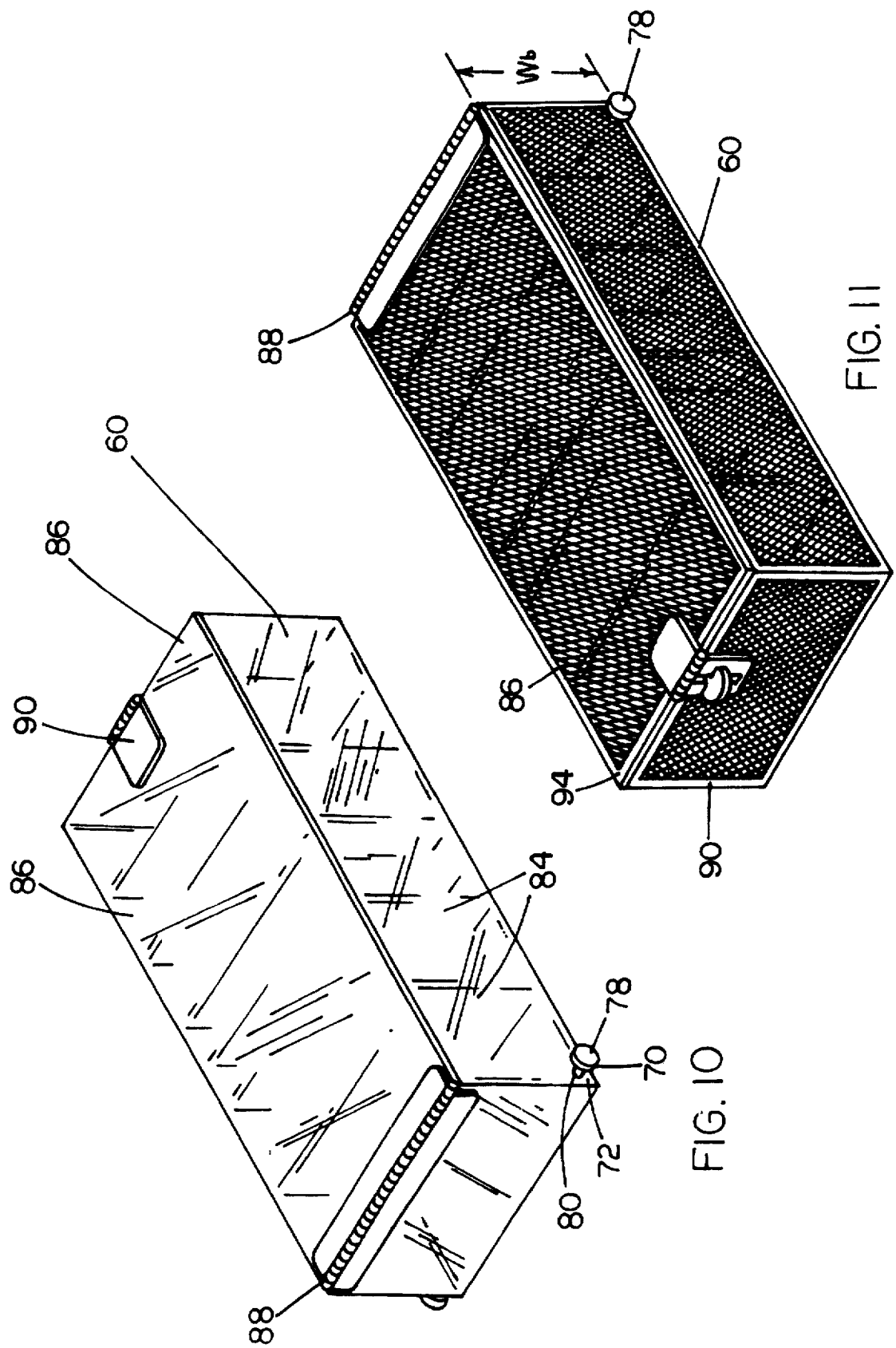

TACKLE MANAGEMENT SYSTEM

This application is a continuation of application Ser. No. 08/315,971; filed; Sep. 30, 1994 now abandoned.

BACKGROUND OF THE INVENTION

1. Field of the Invention

The present invention relates to apparatus for storing fishing tackle or the like and more particularly, to a new system for securely organizing items by using a track arrangement to attach independently accessible boxes to the inside of a cabinet.

2. Related Art

Storing several items such as fishing tackle or the like in an organized manner is a primary concern when quick and easy access is desirable. In particular, packing a tackle box with a wide variety of tackle ensures proper preparation for all situations and types of fish encountered. Unfortunately, when storing several tackle in one box the tackle often become tangled and disorganized. In addition, disorganization is aggravated when the tackle box is subjected to unstable positions. More specifically, in championship fishing where expediency is critical, tackle boxes are frequently dropped or turned completely upside down as the fisherperson rushes to a fish evaluation site. Selecting fishing tackle from a tangled mess of hooks or the like is challenging and impedes the prompt retrieval required when fishing.

Tackle boxes for storing and organizing fishing tackle have been known for many years. Several models commonly used for fishing include small compartments for separating tackle within a larger box. For example, U.S. Pat. No. 5,079,863, issued to Gillespie on Jan. 14, 1992, discloses an apparatus for use with fishing accessories. The apparatus comprises a tackle box with removable plates having a plurality of boxes secured to each plate. The plates are supported in the tackle box and are completely removed from the tackle box for individual tackle selection from one of the boxes secured to the plate. Another example, U.S. Pat. No. 4,958,730 issued to Bunten on Sep. 25, 1990, discloses a compartmented tackle box having a plurality of lure storage drawers slidingly disposed within an enclosure. The lateral sliding movement of the drawers is restricted by a lure storage retaining mean which prevents the drawers from disengaging from the tackle box. For rearrangement of tackle, the boxes are individually emptied and refilled. These boxes prevent the tackle from becoming disorganized provided the box remains in a relatively stable position.

Although such tackle boxes as described in the above-noted patents allow initial arrangement of tackle in an orderly manner, their use is limited in that they do not provide for secure and organized rearrangement of the individual compartments within the box. In addition, most of the boxes are not designed to maintain tackle in an organized manner when subjected to various unstable positions.

There exists a need for a tackle box that provides for secure organization of items and allows for sequential rearrangement of compartments without disengagement from the tackle box. In addition, there exists a need for a tackle box that allows for quick and easy access of tackle. Yet another need exists for a method of drying tackle while contained in the enclosure to prevent moisture damage. And there remains a need for a tackle box which is durable and reliable and will function reliably over its intended lifetime.

SUMMARY

It is therefore, among the several objects and advantages of this invention to provide a tackle box which provides for a system for organizing and securing boxes attached inside a cabinet; which provides for horizontal and vertical positioning of boxes within a cabinet without disengagement of the boxes; which provides for sequential rearrangement of boxes within a cabinet without disengagement of the boxes; which allows for inserting and removing contents within the boxes quickly and easily; which provides customization of boxes to house specific types of fishing tackle or the like; and which is adapted for expedient removal of moisture. And it is another object and advantage of this invention to provide a method for drying fishing tackle while contained in a fishing tackle enclosure.

In accordance with this invention, generally stated a tackle management system for securely organizing fishing tackle or the like, comprising a cabinet, the cabinet having a passageway for removing and inserting a plurality of boxes therein, a plurality of boxes sized for storage within the cabinet, each box of the plurality of boxes having a box opening for removing and inserting items therein, a plurality of channels mounted to an inner surface of the cabinet, wherein the plurality of channels comprise at least one storage channel for storing the plurality of boxes and at least one access channel for accessing the plurality of boxes, wherein the access channel is in communication with the storage channel, channel engaging means located on each box of the plurality of boxes, the channel engaging means adapted for interlocking each box to the plurality of channels, whereby each box may reciprocate between the access channel and the storage channel without disengaging from the cabinet. And for use with a fishing-tackle enclosure, a method of drying tackle while contained in the enclosure.

Other objects will be in part apparent and in part pointed out herein below.

It is to be understood that various changes may be made by one skilled in the art to one or more of the features of the system disclosed herein without departing from the scope or spirit of the present invention.

BRIEF DESCRIPTION OF THE DRAWINGS

FIG. 2 is a front plan view thereof;

FIG. 3 is a top plan view thereof;

FIG. 4 is a bottom plan view thereof;

FIG. 5 is a left side elevational view thereof;

FIG. 6 is a right side elevational view thereof;

FIG. 8 is a front sectional view of the tackle management system showing a locker box in access position;

FIG. 9 is a side sectional view of the tackle management system showing a locker box in storage position;

FIG. 10 is a rear perspective view of a locker box; and

FIG. 11 is a front perspective view of a locker box made of an air-permeable material.

Corresponding reference characters identify corresponding elements throughout the several views of the drawings.

DETAILED DESCRIPTION

Figure 1:
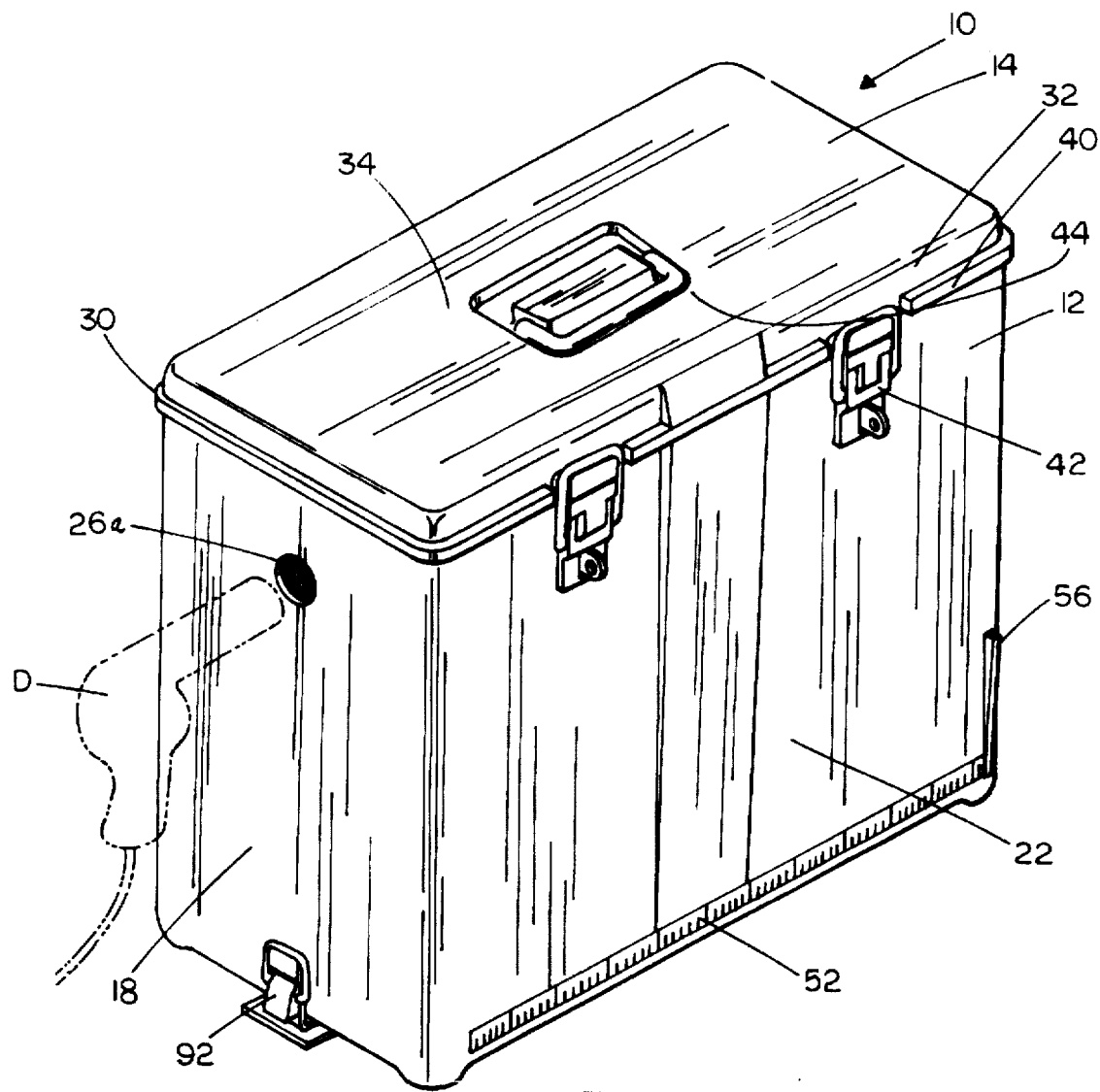
FIG. 1 is a perspective view showing a tackle management system constructed in accordance with this invention.

Referring now to the drawings for one illustrative embodiment of a tackle management system for securely organizing fishing tackle or the like, reference numeral 10 indicates a completed assembly which embodies the invention described herein.

In the embodiment shown in FIGS. 1-6, the tackle management system 10 comprises a rectangular cabinet 12 with a sealing lid 14, bottom portion 16, side walls 18 and 20, front wall 22, and rear wall 24.

In the preferred embodiment, side walls 18 and 20 include corresponding apertures 26a and 26b adapted for receiving a drying apparatus D or other suitable means for drying as shown in FIG. 1. Therefore, by providing openings for receiving drying apparatus D, apertures 26a and 26b are helpful in preventing items stored within the rectangular cabinet 12, such as tackle or the like, from rusting, color fading, or from being negatively affected otherwise from moisture accumulation. More specifically, fishing tackle may be placed in wet condition during use in a fishing tackle-containing enclosure. The tackle may be dried while contained in the enclosure by using one of the apertures such as 26a for ingress of air, and the other aperture 26b for egress of air. Air is forced from an exterior source such as hair dryer D in through aperture 26a for circulation through the enclosure and then out through an aperture 26b. Circulating air through the enclosure, provides for the tackle in wet condition to be dried. As described more fully below, the tackle are housed in box 60 made of sturdy weave material providing air permeability to facilitate the drying process. In addition the embodiment shown in FIG. 4 provides a plurality of apertures 28 in bottom portion 16 to facilitate drying of cabinet 12.

Figure 7:
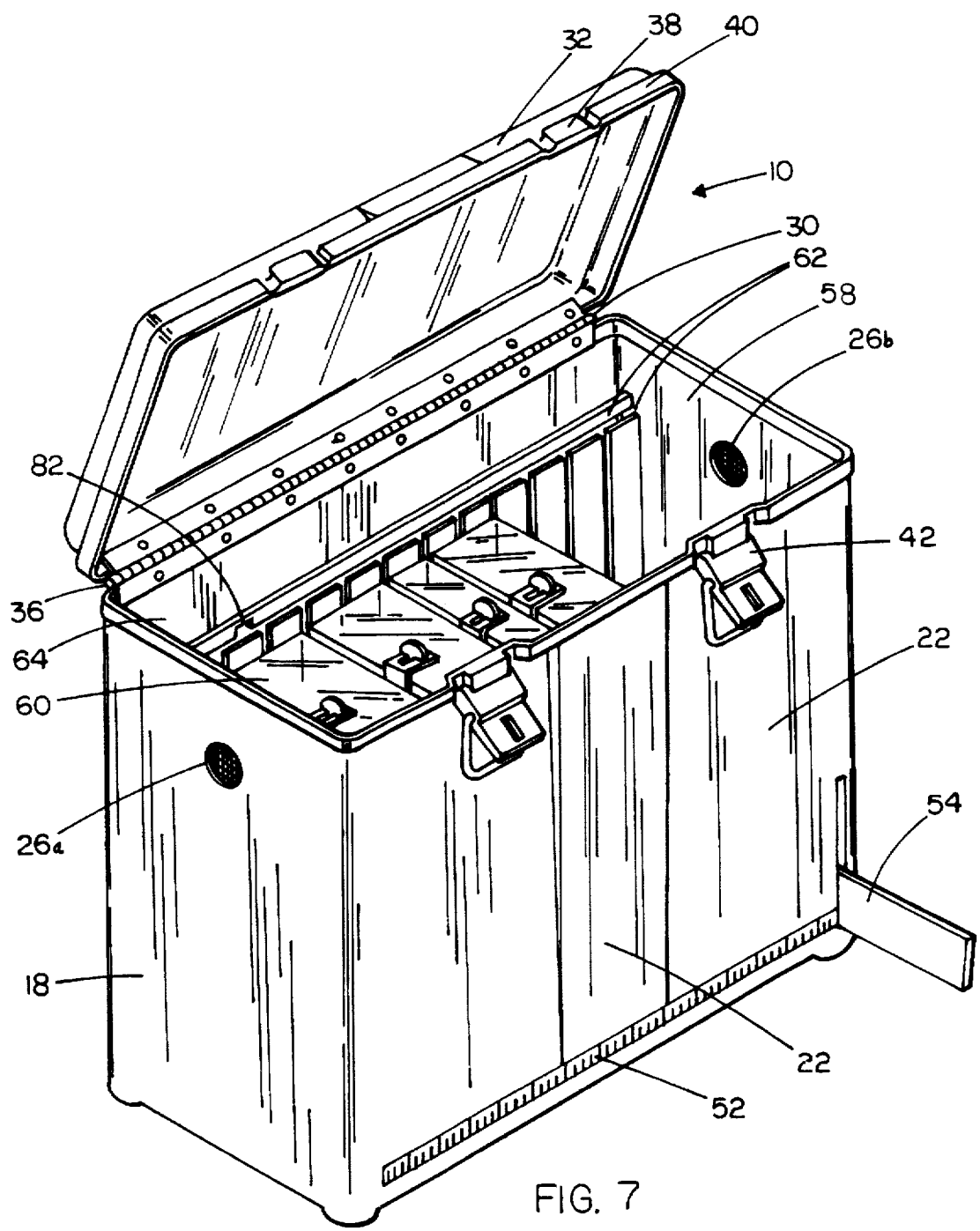
FIG. 7 is a perspective view of FIG. 1 showing a lid in open position and a bumpboard extending from the bottom of the front portion of the box.

The cabinet 12 includes a sealing lid 14 which comprises hinging portion 30, latching portion 32 and upper portion 34. Sealing lid 14 pivotally secures to cabinet 12 at attachment portion 30 by a longitudinal piano hinge 36. Longitudinal piano hinge 36 forms a joint between sealing lid 14 and rectangular cabinet 12 at hinging portion 30. In the preferred embodiment, longitudinal piano hinge 36 is made of a strong, durable, material such as stainless steel, alloys of steel, alloys of aluminum, copper, various polymers, copolymers, etc. The strong material is selected to support the weight of items stored within the tackle management system 10 when transported by a handle 44 of sealing lid 14. As shown in FIG. 7, latch receiving means 38 located opposite longitudinal piano hinge 36 along a lower edge 40 of latching portion 32 provides for closure of sealing lid 14. Latch clamps 42 reciprocally engage and release latch receiving means 38 on latching portion 32 of rectangular cabinet 12 maintaining sealing lid 14 in a closed or opened position respectively.

Handle 44 is centrally located on upper portion 34 of sealing lid 14 for carrying rectangular cabinet 12. In the preferred embodiment handle 44 and latch clamps 42 are made of a durable material such as stainless steel, alloys of steel, alloys of aluminum, various polymers, copolymers, etc. The use of durable material ensures that when latch clamps 42 engage latch receiving means 38, handle 44 may carry and support the weight of rectangular cabinet 12 without breakage of handle 44 or latch clamps 42.

In one embodiment, a length gauge 52 attaches to the lower edge of front wall 22 for measuring fish or the like. A bumpboard 54, as shown in FIG. 7, comprising a rectangular strip is pivotally hinged to the lower corner of rectangular cabinet 12 between front wall 22 and side wall 20 within a receiving slot 56. Receiving slot 56 extends a predetermined length along front wall 22 to house bumpboard 54. When not in use, bumpboard 54 swings upwardly within receiving slot 56. Alternatively, bumpboard 54 swings outwardly from receiving slot 56 to provide a base mark for aligning items along length gage 52 for measurement.

A passageway 58 defined by side walls 18 and 20, front wall 22 and rear wall 24 provide for access into rectangular cabinet 12.

A plurality of boxes 60, as hereinafter more fully discussed, may be removed from and inserted into rectangular cabinet 12 through passageway 58. Each box is slidably received within rectangular cabinet 12. In particular, rectangular cabinet 12 includes a plurality of channels 62 formed on an inner surface 64 of the cabinet for receiving boxes 60. The plurality of channels 62 maintain the boxes 60 in a stable position and provide for rearrangement without disengagement from cabinet 12. The channels 62 comprise at least one storage channel 66 and at least one access channel 68. Each storage channel 66 extends a predetermined distance downwardly along inner surface 64. In the preferred embodiment, several boxes 60 are arranged and positioned in a series of storage channels 66 spaced one inch apart. The boxes 60 remain in storage channels 66 until access of a box 60 is required. An access channel 68 extends vertically across the upper ends of storage channels 66 and provides a means for accessing box 60 when retrieval of tackle within box 60 is necessary. Access channel 68 and storage channels 66 are in communication with each other allowing reciprocation of box 60 from access position to storage position without disengagement from the channels. Therefore the boxes 60 are securely affixed to rectangular cabinet 12 throughout retrieval and rearrangement of tackle during fishing operation. Thus, the boxes 60 are not subject to disruption from being dropped or otherwise dislodged from rectangular cabinet 12.

Channel engaging means 70 extend outwardly from the bottom rear corners 72 of each box 60 for securing each box to the plurality of channels 62. The positioning of channel engaging means 70 permits the box 60 to pivot from an upright position to an access position as shown in FIG. 8 and hereinafter more fully described. Channel engaging means 70 interlock with channels 62. In particular, each channel of the plurality of channels 62 is defined by a head receiving portion 74 adjacent to inner surface 64 and a stem receiving portion 76 tapering inwardly from head receiving portion 74. Correspondingly, as shown in FIGS. 7-11, channel engaging means 70 comprise a head portion 78 and a stem portion 80 for interlocking with channels 62. Head portion 78 coaxially extends outwardly from stem portion 80. The diameter of head portion 78 is larger than the width $W_s$ of stem receiving portion 76 and thus head portion 78 interlocks with channels 62 preventing release of box 60 from channels 62.

Boxes 60 remain interlocked to channels 62 unless disengagement is desired. For disengagement of channel engaging means 70 from the plurality of channels 62 an exit slot 82 is provided. The width of exit slot (or what may also be called an entrance slot) 82 is sized to allow passage of head portion 70 through the plurality of channels 62. For removal of box 60 from cabinet 12 channel engaging means 70 are aligned with exit slot 82 and box 60 is removed from cabinet 12 for storage repacking, replacement or the like.

Each box of the plurality of boxes 60 is sized for interlocking storage within rectangular cabinet 12. Each box is customized to accommodate a particular type of bait, lure, or other items as desired. As shown in FIGS. 10 and 11, the boxes 60 include dividing walls 84 for separating and maintaining tackle or the like in an organized manner. Dividing walls 84 are spaced apart at dimensions corresponding to various sizes of manufactured tackle items or the like. In addition, the width $W_b$ of box 60, indicated in FIG. 11, is also dimensioned accordingly to accommodate various sizes of fishing tackle. In the preferred embodiment $W_b$ is dimensioned in one-inch multiples such as three inches, four inches, etc., to correspond to the one inch spacings between storage channels 66. Boxes 60 comprise a top portion 86 having a piano hinge 88. Box piano hinge 88 pivotally attaches top portion 86 to box 60. In one embodiment, a tab latch 90 provides for closure of top portion 86 with box 60, thus providing for secure storage of tackle or the like within box 60. When tab latch 90 is released, top portion 86 swings open allowing insertion or removal of tackle from within box 60. As discussed above, the embodiment shown in FIG. 11, box 60 is made of a sturdy weave material such as plastic polymers, copolymers, etc. providing air permeability for rapid drying of items within the box. In another embodiment box 60 may be used as a lunch box and is made of an insulating material thus providing a container suitable for keeping items at warm or cool temperatures.

In the embodiment shown in FIG. 1, cabinet 12 is provided with grounding clamps 92 for securing cabinet 12 to a surface such as the bottom of a boat. Thus cabinet 12 may be secured to a receiving hook or the like on the boat preventing random sliding of cabinet 12 within the boat when turbulent water conditions are encountered.

In operation, a plurality of boxes 60 are independently stocked with tackle or the like as desired. The boxes are individually inserted into cabinet 12 by aligning channel engaging means 70 with exit slot 82 and pressing each box 60 onto access channel 68. Each box is moved across access channel 68 until positioned in alignment with the storage channel 66 corresponding to placement within cabinet 12 as desired. The box is transferred from access channel 68 to storage channel 66 by pressing box downwardly and moving it down storage channel 66 until positioned on bottom portion 16 of cabinet 12. Each of the remaining boxes selected for use are subsequently stocked with tackle and inserted into cabinet 12. The boxes 60 may be rearranged or retrieved at any time before, during or after fishing simply by pulling tab latch 90 upward towards sealing lid 14. If complete box removal is desired, channel engaging means 70 are aligned with access channel 68 and positioned into alignment with exit slot 82. The box 60 may then be removed by pulling upwardly to disengage box from the plurality of channels 62. Alternatively, as shown in FIG. 8, box 60 may be accessed during fishing operations without complete removal by aligning channel engaging means with access channel 68 and pivoting the end of box 60 at bottom rear corners 72 by channel engaging means 70 and moving front top corners 94 downwardly. Thus the contents of box 60 are quickly and easily accessed by releasing tab latch 90 and opening top portion 86 for retrieval of tackle or the like. By providing for access and rearrangement of boxes 60 without disengagement from cabinet 12, the boxes are prevented from being individually dropped and displaced out of reach while fishing. In addition each box 60 within cabinet 12 is equally accessible with respect to the other boxes thus eliminating the need for prolonged searching for a box or cumbersome retrieval of a box during fishing.

In view of the foregoing, it will be seen that several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all material contained in the foregoing description or shown in the accompanying drawings should be interpreted as illustrative rather than limiting.

I claim:

1. A tackle management system for securely organizing fishing tackle or the like, the system comprising;
   a cabinet, the cabinet having a passageway for removing and inserting a plurality of boxes therein;
   a plurality of boxes sized for storage within the cabinet, each box of the plurality of boxes having a box opening for removing and inserting items therein;
   a plurality of channels mounted to an inner surface of the cabinet, wherein the plurality of channels comprise at least one storage channel for storing the plurality of boxes and at least one access channel for accessing the plurality of boxes, wherein the access channel is in communication with the storage channel and the access channel further provides an entrance slot for inserting and removing the plurality of boxes from the cabinet;
   channel engaging means located on each box of the plurality of boxes, the channel engaging means selectively removably interlocking each box to the plurality of channels; and
   whereby each box may slidingly reciprocate between the access channel and the storage channel without disengaging from the cabinet.

2. A tackle management system as defined in claim 1, wherein the tackle management system includes grounding clamps for securing a lower surface of the cabinet to the floor.

3. A tackle management system as defined in claim 1 wherein each of the plurality of boxes is individually adapted for containing a specific type of fishing tackle or the like.

4. A tackle management system as defined in claim 1 wherein the channel engaging means comprises a box appendage extending outwardly from each box of the plurality of boxes, wherein the box appendage is adapted for interlocking with the plurality of channels.

5. A tackle management system as defined in claim 1 wherein the storage channel extends a predetermined distance downwardly along an inner surface of the cabinet.

6. A tackle management system as defined in claim 1 wherein the access channel extends across an end of the storage channel, wherein the storage channel end is adjacent the passageway.

7. A tackle management system as defined in claim 1 wherein the cabinet includes an exterior wall surface having an aperture sized for receiving a drying apparatus to dry the fishing tackle or the like inside the cabinet.

8. A tackle management system as defined in claim 1 wherein the cabinet includes a bump board extending outwardly from said cabinet for measuring a fish or the like.

9. A tackle management system as defined in claim 1 wherein the passageway further comprises a door secured to the top portion of the cabinet.

10. A tackle management system as defined in claim 9 wherein the door has an outer edge secured to the cabinet by a piano hinge.

11. A tackle management system as defined in claim 9 wherein the cabinet includes latch means for locking said door in a closed position.

12. A tackle management system for securely organizing fishing tackle or the like, the system comprising a cabinet, the cabinet having a base, a plurality of walls, a door providing a passageway for removing and inserting boxes or the like into and out of the cabinet, a plurality of boxes adapted for storage within the cabinet and for accommodating fishing tackle or the like, the plurality of boxes being movable into and out of the cabinet, each of the boxes having a box opening for removing and inserting fishing tackle or the like, interlocking means for securing the plurality of boxes within the cabinet, the interlocking means comprising at least one box appendage extending outwardly from each box of said plurality of boxes, and a plurality of channels on the inner side of at least one wall of the plurality of walls, each channel of the plurality of channels being adapted for interlocking with the box appendage, the plurality of channels including at least one storage channel and at least one access channel, the storage channel extending a predetermined distance downwardly along one of the cabinet walls for positioning and securing a box of the plurality of boxes in a storage position, the access channel extending across an end of the storage channel the end being adjacent to the door, the access channel providing for positioning a box of the plurality of boxes in an access position, wherein the box is secured to the plurality of channels by the box appendage whereby the box may reciprocate between the access channel and the storage channel without disengaging from the cabinet.

13. A tackle management system as defined in claim 12 and further comprising latch means for securing the door in a closed position.

14. A tackle management system as defined in claim 12 wherein the access channel further provides an entrance slot for inserting and removing the plurality of boxes from the cabinet.

15. A tackle management system as defined in claim 12 wherein the storage position comprises the box appendage being aligned with the storage channel and the box opening adjacent one of the plurality of walls.

16. A tackle management system as defined in claim 12 wherein the access position comprises the box appendage being aligned with the access channel and the box opening adjacent the door.

17. A tackle management system as defined in claim 12 wherein each of the plurality of boxes is individually adapted for containing a specific type of fishing tackle or the like.

18. A tackle management system for securely organizing fishing tackle or the like, the system comprising a cabinet sized for containing a plurality of boxes, a plurality of boxes being selectively removably secured within the cabinet and slidably movable therein from a storage position to an access position, whereby each box of the plurality of boxes is independently accessible and may reciprocate between an access channel and a storage channel without disengaging from the cabinet, and the access channel providing an entrance slot for inserting and removing the plurality of boxes from the cabinet.

19. For use with a fishing tackle-containing enclosure wherein fishing tackle may be placed in wet condition during use, a method of drying the tackle while contained in the enclosure, comprising providing at least a first opening in the enclosure for ingress of air, and at least one further opening in the enclosure for egress of air, and forcing air under pressure from an exterior air pressure source in through the first opening for forced air circulation through the enclosure and then out through the at least one further opening, whereby the tackle in wet condition is dried by the air circulating under pressure through the enclosure.

20. For use with a fishing tackle enclosure, the method according to claim 19 wherein the first opening is sized for receiving an outlet nozzle of a hair dryer, from exteriorly of the enclosure, and the exterior source of air is a hair dryer for forcing air through the enclosure.

* * * * *